US006392248B1

(12) United States Patent
Takahara et al.

(10) Patent No.: US 6,392,248 B1
(45) Date of Patent: May 21, 2002

(54) METHOD AND APPARATUS FOR COLOR RADIOGRAPHY, AND COLOR LIGHT EMISSION SHEET THEREFOR

(75) Inventors: Takeshi Takahara; Akihisa Saito; Eiji Oyaizu; Koichi Nittoh; Toshiyuki Tamura, all of Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 22 days.

(21) Appl. No.: 09/704,526

(22) Filed: Nov. 3, 2000

(30) Foreign Application Priority Data

Nov. 5, 1999 (JP) .......................................... 11-315375

(51) Int. Cl.[7] ................................................ G01T 1/24

(52) U.S. Cl. .................... 250/580; 250/306; 250/458.1; 250/483.1; 250/472.1; 378/98.8; 378/98.9; 378/98.3

(58) Field of Search ................................ 250/580, 306, 250/458.1, 483.1, 472.1; 378/98.8, 98.9, 98.3

(56) References Cited

U.S. PATENT DOCUMENTS 3,591,802 A 7/1971 Tajima ........................ 250/65
4,195,228 A * 3/1980 Rabatin .................. 250/483.1
5,886,359 A * 3/1999 Bringley et al. ......... 250/483.1

FOREIGN PATENT DOCUMENTS

JP 48-6157 2/1973
JP 48-12676 4/1973

OTHER PUBLICATIONS

Koichi Nittoh et al., "Discriminated neutron and X–ray radiography using multi–color scintillation detector," *Nuclear Instruments and Methods in Physics Research*, Section A vol. 428, No. 2–3, Elsevier Science B.V., pp. 583–588, 1999.

* cited by examiner

*Primary Examiner*—Constantine Hannaher
*Assistant Examiner*—Andrew Israel
(74) *Attorney, Agent, or Firm*—Foley & Lardner

(57) ABSTRACT

A color radiography system comprises a color light emission sheet having a phosphor layer that contains a phosphor emitting in a plurality of colors to radiation and emits light under irradiation of radiation transmitted through a subject to be inspected, and a color film or a color camera that detects the light emissions of the plurality of colors into the respective colors. In the phosphor layer, a phosphor is used that has a primary emission component corresponding to one emission color in a visible light region and at least one secondary emission component, the secondary emission component having an emission color different from that of the primary emission component and a ratio of light emission to radiation of the same intensity being different from that of the primary emission component. According to the present color radiography system, image information of a plurality of colors having different sensitivity characteristics can be obtained. The image information of an appropriate density can be obtained under various conditions.

26 Claims, 11 Drawing Sheets

METHOD AND APPARATUS FOR COLOR RADIOGRAPHY, AND COLOR LIGHT EMISSION SHEET THEREFOR

BACKGROUND OF THE INVENTION

1. Field of the Invention

The present invention relates to a novel method and apparatus for color radiography applied to medical diagnosis or various kinds of non-destructive inspections, and color light emission sheet therefor.

2. Description of the Related Art

In radiography used for medical diagnosis or industrial non-destructive inspection, it is usual to use a combination of an X-ray film and an intensifying screen to enhance sensitivity of a radiography system. In the radiography, light converted into visible light by irradiating X-rays transmitted through a subject to be inspected on the intensifying screen reduces for instance silver grains on a monochrome X-ray film to blacken, thereby obtaining a transmission image of the subject.

A radiation intensifying screen used in radiography or the like is generally constituted of a support consisting of paper board or plastics, a phosphor layer having a light emission peak corresponding to the X-ray film, and a protective film for protecting the phosphor layer, laminated in this order. Recently, in addition, there is a method where with a light detecting element such as a CCD camera or the like as an imaging system to do without the X-ray film, difference of an amount of transmission of the radiation being digitally detected.

X-radiography for medical diagnosis is applied to various parts of a human body to find out various kinds of foci. In recent years, in order to improve detection sensitivity, a higher contrast X-ray film is main stream. For instance, in mammography due to X-rays (mammography, hereafter), calcification and abnormal soft tissue in a mamma in which difference of X-ray absorption is very scarce have to be radiographed with high resolution and appropriate contrast. To this end, an X-ray tube having a Mo target generating X-rays of approximately 30 kV is used and, in addition, a high contrast X-ray film being used.

In the aforementioned X-radiography, energy of irradiated X-rays and an irradiation period have to be optimized according to the subject, thereby a radiogram of an appropriate film density being obtained. Conditions for radiography are determined further based on a dynamic range (latitude) of the X-ray film, parts to be radiographed of a human body that is a subject and individual difference.

Optimization of the radiographing conditions necessitates a lot of experiences to result in depending on individual technician's skill. Accordingly, depending on the technician's skill, the conditions may deviate from the optimum ones to result in poor X-ray exposure (black radiograph) or excessive X-ray exposure (blank radiograph). In particular, when an X-ray film of high contrast is used, the range of the optimum conditions is very narrow to be likely to result in the poor exposure or excessive exposure.

That is, the contrast characteristics of an existing X-ray film can be understood from a characteristic curve of a film as shown in FIG. 13. In FIG. 13, ordinate denotes film density when the film is exposed, abscissa denoting logarithmic value of the exposure (relative value). The characteristic curve of the film can be divided into three portions based on its shape. A curve portion A of relatively low exposure is called a leg region and corresponds to a low film density portion of a radiograph to result in a very low contrast image or no contrast image. A curve portion C of relatively high exposure is called a shoulder region. There is an upper limit in film density. Accordingly, exposure variation in the C region does not cause variation in contrast.

The highest contrast region B is located interposed between the aforementioned leg region and the shoulder region. The characteristic curve in the region B has a relatively straight and large gradient. The characteristic curve of the X-ray film is determined dependent on parameters such as a grain diameter of silver compound in an emulsion and a thickness thereof. Accordingly, by controlling these parameters, the films different. in sensitivity and contrast characteristics can be obtained. The high contrast X-ray film is one the gradient of which is large in the region B of the characteristic curve.

The densities of the leg and shoulder regions of the characteristic curve are approximately the same for all films. Accordingly, the larger gradient of the characteristic curve causes a narrower range of exposure (latitude) in the region B. In radiographing, the X-ray exposure is preferable to be set at just midway of the region B. However, when an X-ray film of particularly narrow latitude is used, a slight deviation of the conditions causes an image of an inappropriate density. In the existing X-ray film, a width of latitude is approximately one to two digits.

Furthermore, as in the case of the target subjects being blood and tissue, when element compositions of the target subjects are different, taking X-ray energy to be used and the thickness of the subject into consideration, an irradiation period (exposure period) has to be determined based on much experience. When, as in the case of normal tissue and abnormal tissue such as cancer tissue, the element compositions are approximately the same but the densities are different, the situation is also the same. In setting such conditions, the skill of the technician affects largely. In particular, in recent medical diagnosis, as in the case of early findings of cancer for instance, there is a strong demand for a correct detection of an extremely small abnormal tissue. However, a slight deviation of the radiographing condition may cause a radiograph of an inappropriate film density.

Such problems, without restricting to the radiography for medical diagnosis, also similarly occur in the industrial non-destructive inspection. For instance, when the target subjects are aluminum and iron, due to density difference thereof, the optimum conditions for radiographing are naturally different. In addition to this, the thickness of the target subject has to be considered. Furthermore, when there are contained a plurality of substances as in composite material, many radiographs have to be taken while changing the irradiation condition, handling inconveniences causing many problems.

In the existing radiography, it is general to obtain, with the monochrome X-ray film :as mentioned above, a radiograph of a target subject as a monochrome gray-scale image. In the monochrome gray-scale image, it is difficult to draw information out of a slight density change. To overcome such difficulties, there is proposed color radiography (cf. Japanese Patent SHO 48-6157 Official Gazette and Japanese Patent SHO 48-12676 Official Gazette). In the above color radiography, a fluorescent screen (or intensifying screen) furnished with a plurality of line spectra by means of two or more kinds of phosphors is used, thereby the respective color sensitive layers of color film being independently sensitized.

According to the color radiography, a radiograph in which a color changes in accordance with the difference of an amount of X-rays (color radiograph) can be obtained. In the obtained color radiograph, the low exposure portion is colored in red, as the exposure increases a green color starts to mingle with red, a further increase of exposure causing blue to mingle with red and green. A still further increase of the exposure results in white.

However, how hard trying to draw information only out of color variation on the color radiograph, for instance in the portion where much X-ray is exposed, as a result of addition of green and blue to red, the color becomes whitish to be rather difficult in drawing out the information. Furthermore, in the lower exposure portion, there is no difference from the existing monochrome radiograph until the red color component saturates. Accordingly, for the part of lower contrast in comparison with the existing monochrome radiograph, it is difficult to draw out the information.

As mentioned above, in the existing radiography, in particular when a high contrast X-ray film of which gradient in the B region of the characteristic curve is made larger is employed, a slight deviation of the radiographing conditions results in a radiograph of an inappropriate density. Furthermore, since an amount of X-ray transmission depends on a specific gravity and density of a target subject, when radiographing parts where there are substances of different specific gravity or parts where there are the same substances of different densities, the radiographing conditioning is very difficult to set. From these too, a radiograph of an appropriate density can not be obtained.

By contrast, the existing color radiography obtains a color radiograph in which in accordance only with the difference of the amount of X-rays, a color is varied. It is difficult to draw information only out of color variation on a color radiograph. Even if there is a lot of information on the radiograph, it can not be effectively utilized. Furthermore, depending on the case, the information can be drawn out with much difficulty than in the ordinary monochrome radiograph.

From the above, there is a strong demand for a radiography system that with for instance the contrast of a radiograph increased, while preventing poor exposure or excessive exposure due to a slight deviation of the radiographing condition from occurring, further enables to utilize effectively much of the obtained information. That is, a radiography system that in addition to obtaining radiographs of appropriate film density under a relatively broad condition, enables to obtain effectively a great deal of information from the obtained radiograph is demanded. Alleviation of condition setting during radiographing can not only prevent miss shots during radiographing but also largely contribute in increasing inspection accuracy.

SUMMARY OF THE INVENTION

Accordingly, an object of the present invention is to provide a system for radiography, that is, a method and apparatus for color radiography, in which even when for instance a contrast of a radiograph is increased, under various conditions a radiograph of appropriate film density can be obtained. Another object of the present invention is to provide a method and apparatus for color radiography that enables to obtain assuredly and effectively a lot of information by radiographing one time. Still another object of the present invention is to provide a color light emission sheet used for such radiography system.

The method of color radiography of the present invention comprises a step of irradiating radiation on a subject, a step of irradiating the transmitted radiation on a phosphor, and a step of separating the light into the respective colors to detect. In the step of irradiating the transmitted radiation on a phosphor, the radiation transmitted through the subject is irradiated on the phosphor that emits in a plurality of colors due to the radiation, ratios of light emissions of the plurality of colors to radiation of the same intensity being different. The step of separating the light into the respective colors to detect separates the light emitted in a plurality of colors from the phosphor under the irradiation of the radiation into the respective colors to detect.

In the present method for color radiography, as a specific means for differentiating the ratios of light emissions of a plurality of colors, a method using for instance a phosphor can be cited. The phosphor comprises a primary emission component, and at least one secondary emission component. The primary emission component corresponds to one emission color in the visible light region. The secondary emission component has an emission color different from that of the primary emission component and is different in a ratio of light emission to the radiation of the same intensity from that of the primary emission component. Furthermore, the light emitted from the phosphor can be allowed to transmit through a color filter unit to adjust the ratios of the light emissions of a plurality of colors.

In the present method of color radiography, the step of separating the light to detect can be implemented as follows. That is, after collectively imaging the light emitted in a plurality of colors from the phosphor, the respective color signals corresponding to the light emissions of a plurality of colors are separated from the image to detect. Alternatively, the step of separating the light to detect can be implemented by separating the light emitted in a plurality of colors into the respective colors with a light detection element to detect.

Furthermore, the present method for color radiography can be configured as follows. That is, with at least two kinds of phosphors each containing as a primary component an element different in K absorption edge from the other, a substance having a K absorption edge intermediate between the K absorption edges of the aforementioned elements is detected. Such method of color radiography is particularly effective in angiography or the like.

An apparatus for color radiography of the present invention comprises a radiation:source irradiating radiation to a subject, color light emission means, and means for separating/detecting. The color light emission means has a phosphor that upon irradiating the radiation transmitted through the subject, emits in a plurality of colors due to the radiation, ratios of the light emissions of the plurality of colors to the radiation of the same intensity being different. The means for separating/detecting separates the light emitted in the plurality of colors from the phosphor based on the irradiation of the radiation in to the respective colors to detect.

In an apparatus for color radiography of the present invention, for light detection means, for instance, a color X-ray film, a color camera, and a combination of color separating means and a plurality of monochrome cameras can be used. The color X-ray film converts collectively the light emitted in a plurality of colors from the phosphor into a color image. The color camera detects collectively the light emitted in a plurality of colors. The color separating means separates the light emissions of a plurality of colors. The plurality of monochrome cameras detects the light emissions of the separated respective colors.

In the present method and apparatus for color radiography (hereafter, color radiography system), a phosphor emitting in a plurality of colors under the irradiation of radiation enables to have different information for each color, furthermore the information contained in the respective colors being separated into the respective colors to detect. Thereby, the information contained in the respective color signals can be effectively and assuredly obtained. In addition, through acquisition of a plurality of image information having different sensitivity characteristics for the respective colors, the dynamic range during radiographing can be broadened.

In the present invention; a color light emission sheet containing a phosphor having for instance a plurality of emission wavelength regions in the visible light region can be used. That is, a phosphor having an emission spectrum corresponding to at least two emission colors among blue emission, green emission and red emission can be used for the above sheet. Now, light emitted in a plurality of colors from such color light emission sheet is collectively converted into an image on a color film. When the ratios (brightness) of the light emissions of the plurality of colors to the radiation of the same intensity are different, the characteristic curve as shown for instance in FIG. 13 can be plurally obtained in different exposure ranges.

FIG. 1 shows one example of characteristic curves obtained from color films exposed to the light emitted from a color light emission sheet when X-rays are irradiated thereon while varying an amount of X-ray irradiation. The color light emission sheet comprises a phosphor of which red light emission as the primary light emission component is 60%, green light emission as a first secondary light emission component 30%, and blue light emission as a second secondary light emission component 10%. When the characteristic curve between film density and exposure for each of three colors is the same as shown in FIG. 13, as shown in FIG. 1, a plurality of characteristic curves different in exposure range can be obtained. From FIG. 1, it is found that when the red light emission has saturated the green and blue ones have not, when the green one has saturated the blue one has not.

By obtaining a plurality of characteristic curves, a range of exposure (latitude) for an appropriate range of film density required in radiography can be largely expanded in comparison with the existing case of one characteristic curve (FIG. 13). If an appropriate range of film density is 0.5 to 3.5, a relative exposure corresponding to the range of film density is approximately 1 in FIG. 13, by contrast approximately 1.8 in FIG. 1. Since the relative exposure is a logarithmic value, the above value means an expansion of the range of exposure to approximately 6.3 times ($=10^{1.8}/10^{1}$).

That is, according to the present color radiography system, the dynamic range in taking radiographs can be largely broadened. The situation is identical even when, instead of the color film, a light detecting element such as a CCD camera or the like is employed. Accordingly, even if the system conditions or the radiographing conditions are a little bit deviated from the appropriate range, an image of a density appropriate for medical diagnosis or non-destructive inspection can be obtained. This largely contributes in suppressing failure due to poor exposure or excessive exposure during radiographing.

In the present color radiography system, much information based on a plurality of characteristic curves is separated from the aforementioned image information into the respective color signals to detect. Accordingly, much information contained in the respective color signals can be effectively and assuredly obtained. In other words, a plurality of image information having a sensitivity characteristic different for each color can be obtained. Accordingly, by taking the advantage of such plurality of image information to carry out medical diagnosis or non-destructive inspection, medical diagnosis ability and accuracy in non-destructive inspection can be greatly improved. That is, the dynamic range in the radiography for medical diagnosis or for non-destructive inspection can be expanded.

The color light emission sheet of the present invention comprises a sheet base, and a phosphor layer configured in a single layer that is disposed on the sheet base and contains a phosphor. The phosphor has a primary emission component emitting primarily to radiation and at least one secondary emission component. Of the secondary emission component, an emission color is different from that of the primary emission component and a ratio of light emission to the radiation of the same intensity is different from that of the primary emission component. Here, the ratios of the light emissions of the primary emission component and the secondary emission component are adjusted according to the dynamic range of the radiographing system.

In the color light emission sheet of the present invention, for the phosphors constituting the phosphor layer, the following can be preferably used. For instance, a europium activated gadolinium oxysulfide phosphor and a europium activated yttrium oxysulfide phosphor can be preferably used, the ratios of the light emissions of the primary emission component and the secondary emission component being adjusted through an amount of europium activator. A terbium activated gadolinium oxysulfide phosphor in which the ratios of the light emissions of the primary emission component and the secondary emission component are adjusted through an amount of terbium activator can be preferably employed. In addition, a calcium tungstate phosphor in which part of calcium is replaced by magnesium to adjust the ratios of the light emissions of the primary emission component and the secondary emission component can be preferably employed.

DESCRIPTION OF THE PREFERRED EMBODIMENTS

In the following, embodiments for implementing the present invention will be described.

Figure 2:
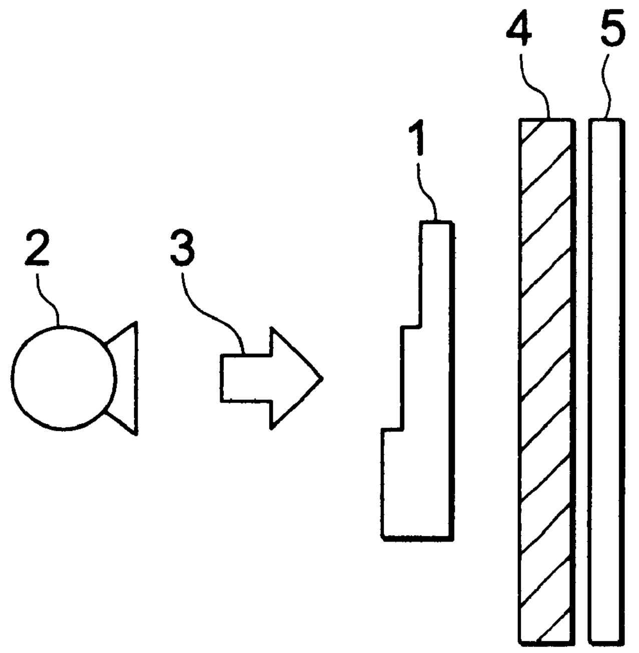
FIG. 2 is a diagram showing schematically a configuration of a first embodiment of an apparatus for radiography in which the present color radiography system is applied.

FIG. 2 is a color radiography system where a method of color radiography of the present invention is applied, that is a diagram showing schematically a substantial configuration of a first embodiment of an apparatus for radiography. In the figure, reference numeral 1 denotes a subject such as a human body or various kinds of articles, to the subject 1 radiation such as X-rays 3 from a radiation source such as an X-ray tube 2 being irradiated. The radiation to be used in radiography, without restricting to X-rays (or $\gamma$-rays), can be $\beta$-rays or thermal neutron flux.

The X-rays 3 are, after absorption or scattering due to the subject 1, irradiated on a color light emission sheet 4 as color light emission means. The color light emission sheet 4, as will be mentioned later in detail, comprises a phosphor emitting in a plurality of colors to the radiation such as the X-rays 3. A light emission of a plurality of colors emitted from the color light emission sheet 4 has a brightness distribution in accordance with a distribution of the X-rays after absorption and scattering by the subject 1.

Behind the color light emission sheet 4, as means for collectively imaging the light emission of a plurality of colors from the color light emission sheet 4, a color film 5 is disposed, thereon an image based on the subject 1 being formed. That is, the color film 5 is exposed by the light emitted in a plurality of colors from the color light emission sheet 4 to form collectively an image of a plurality of colors based on the respective emission colors.

In the FIG. 2, the color light emission sheet 4 and the color film 5 are stacked for the color light emission sheet 4 to be on the subject 1 side (radiation source side). In such case, a transparent type color light emission sheet 4 is used. When a reflective type color light emission sheet 4 is used, the color film 5 and the color light emission sheet 4 are stacked for the color film 5 to be on the subject 1 side (radiation source side).

Figure 3:
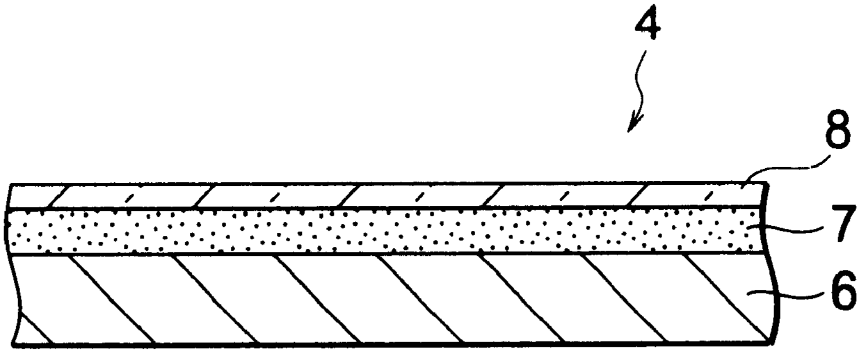
FIG. 3 is a sectional view showing one example of a configuration of a color light emission sheet used in the apparatus for radiography of FIG. 2.

The color light emission sheet 4 comprises, as shown in FIG. 3 for instance, a flexible sheet base 6 consisting of a plastic film or nonwoven fabric, thereon 6 a phosphor layer 7 being disposed. On the above of the phosphor layer 7, as demands arise, a transparent protective film 8 consisting of a polyethylene terephthalate film or the like of a thickness of for instance approximately several $\mu$m is disposed.

The aforementioned phosphor layer 7 contains a phosphor emitting in a plurality of colors, that is, a phosphor having a plurality of emission wavelength regions. In the phosphor layer 7, taking into consideration to be used in combination with for instance the color film 5, a phosphor emitting in a broad wavelength range within the visible light region (for instance a region of a wavelength of 400 to 700 nm) can be preferably used. In specific, a phosphor having an emission spectrum corresponding to at least two emission colors within the visible light region is preferably used. That is, a phosphor having an emission spectrum containing a primary emission component and a secondary emission component that are different in the emission color from each other can be preferably used.

As the emission color of the phosphor, at least two emission colors among blue, green and red emission colors can be cited as typical ones. However, in the present invention, without restricting to the aforementioned emission colors, various emission colors that can be differentiated from each other on the image of the color film 5 or by a CCD camera that will be described later can be applied. For instance, purple light emission close to ultra-violet rays or yellow light emission can be used.

In the present color radiography system, with a plurality of light emissions, an image of a plurality of colors is collectively obtained. In addition to the above, ratios of light emissions of a plurality of colors under the same radiation intensity are differentiated to enlarge a range of exposure (latitude). As specific means for differentiating the ratios of a plurality of emission colors, a ratio of a secondary emission component is decreased in comparison with that of a primary emission component.

That is, the phosphor used in the present invention preferably comprises an emission spectrum having a primary emission component corresponding to one emission color within the visible light region and at least one secondary emission component. The secondary emission component has an emission color different from that of the primary emission component and is smaller in a light emission ratio, that is, brightness to the radiation of the same intensity than that of the primary emission component. The specific brightness of the secondary emission component, as mentioned in detail later, is preferable to be in the range of 0.1 to 90% relative to the brightness of the primary emission component.

A phosphor of which primary emission component and the secondary emission component are approximately equal in the light emission ratio, for instance a mixed phosphor emitting in white can be used. In this case, as mentioned later, preceding the means for detecting the light emitted in a plurality of colors into the respective colors, color filters of which transmittance for each:color is different from each other are disposed. Thereby, a ratio of light emission, in other words sensitivity characteristic for each color, can be adjusted.

As a phosphor having the aforementioned emission spectrum, for instance a phosphor having the emission peaks in a plurality of emission wavelength regions corresponding to the respective emission colors can be cited. Alternatively, a phosphor having a broad emission peak extending over a plurality of emission wavelength regions can be cited. As specific examples of the former ones, rare earth phosphors such as europium activated gadolinium oxysulfide phosphor ($Gd_2O_2S$:Eu), europium activated yttrium oxysulfide phosphor ($Y_2O_2S$:Eu), and terbium activated gadolinium phosphor ($Gd_2O_2S$:Tb) can be cited. Furthermore, as the specific example of the latter case, calcium tungstate ($CaWO_4$) phosphor can be cited.

Figure 4:
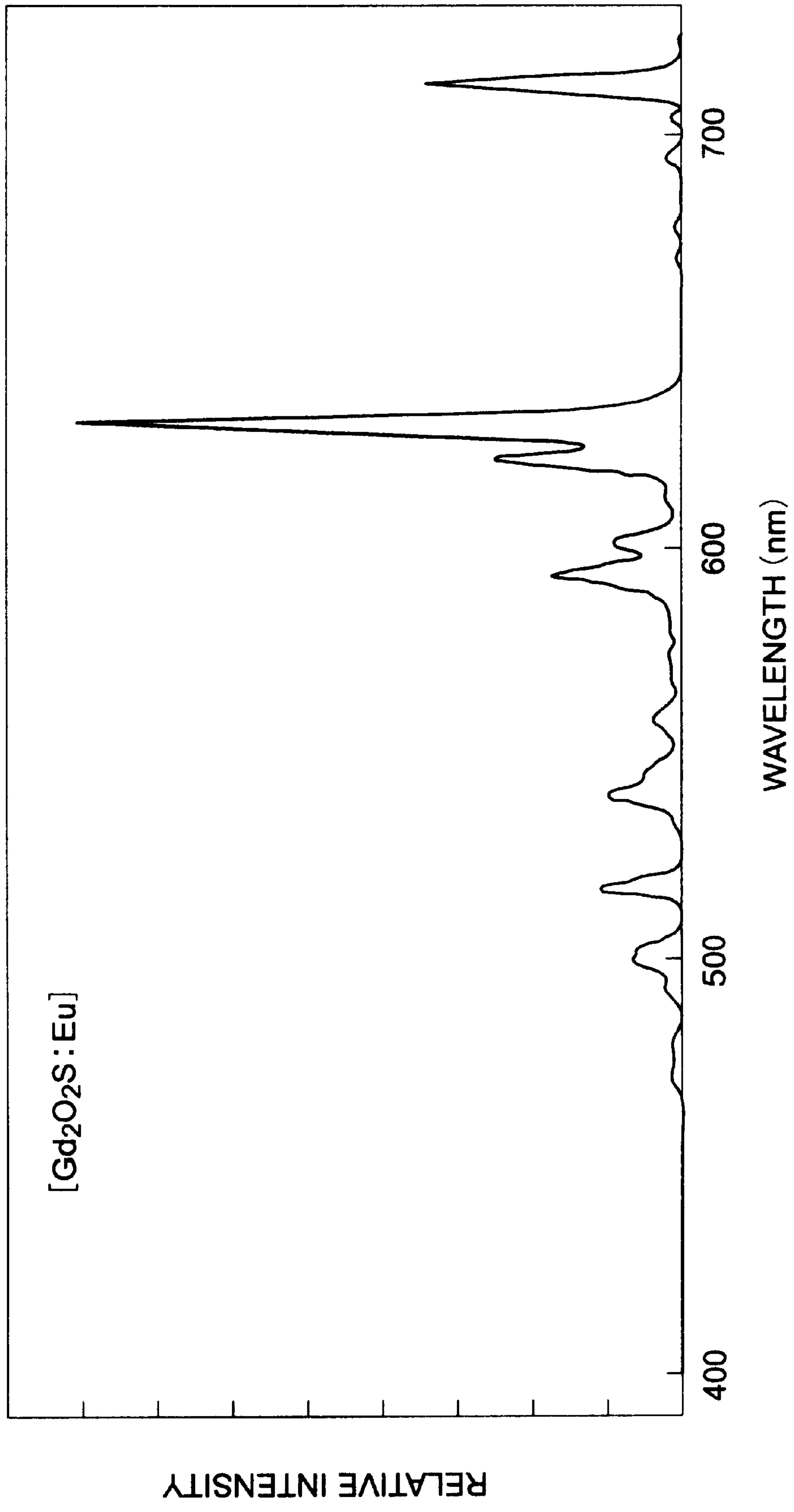
FIG. 4 is a diagram showing one example of an emission spectrum of a $Gd_2O_2S$:Eu phosphor used in the present color light emission sheet.

FIG. 4 is an emission spectrum of a $Gd_2O_2S$:Eu phosphor. There are a primary emission component in a red wavelength region (approximately a region of a wavelength of 600 to 700 nm) and a secondary emission component in a green wavelength region (approximately a region of a wavelength of 500 to 600 nm). Since $Gd_2O_2S$:Eu and $Y_2O_2S$:Eu phosphors emit through excitation of Eu atoms, the emission spectrum is sharp and easy in separating the emission spectrum. Furthermore, through an amount of Eu activator, ratios of light emissions of the respective components can be adjusted. Accordingly, these phosphors can be said to be preferable ones. In such $Gd_2O_2S$:Eu and $Y_2O_2S$:Eu phosphors, from a viewpoint of expanding a range of emission wavelength, an Eu concentration is preferable to be in the range of 0.1 to 10 mol %.

Figure 5:
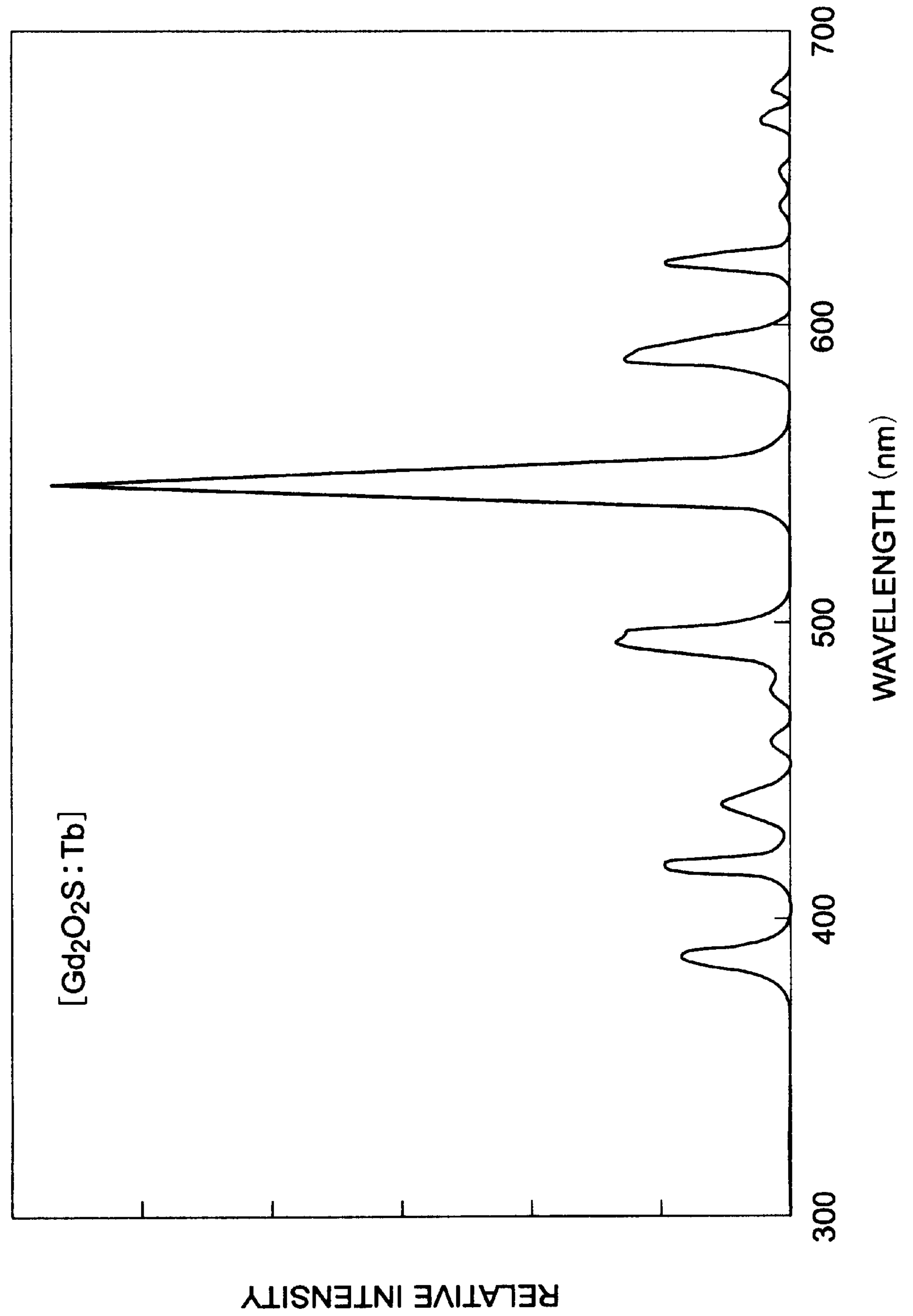
FIG. 5 is a diagram showing one example of an emission spectrum of a $Gd_2O_2S$:Tb phosphor used in the present color light emission sheet.

FIG. 5 is an emission spectrum of a $Gd_2O_2S$:Tb phosphor. There are a primary emission component in a green wavelength region and a secondary emission component in a blue wavelength region (approximately a region of a wavelength of 400 to 500 nm). In the $Gd_2O_2S$:Tb phosphor too, through an amount of Tb activator the ratios of light emissions of the respective emission components:can be controlled. In the present invention, since a phosphor broad in the emission wavelength region is suitable, a Tb concentration in the $Gd_2O_2S$:Tb phosphor is preferable to be in the range of 0.01 to 1 mol %.

Figure 6:
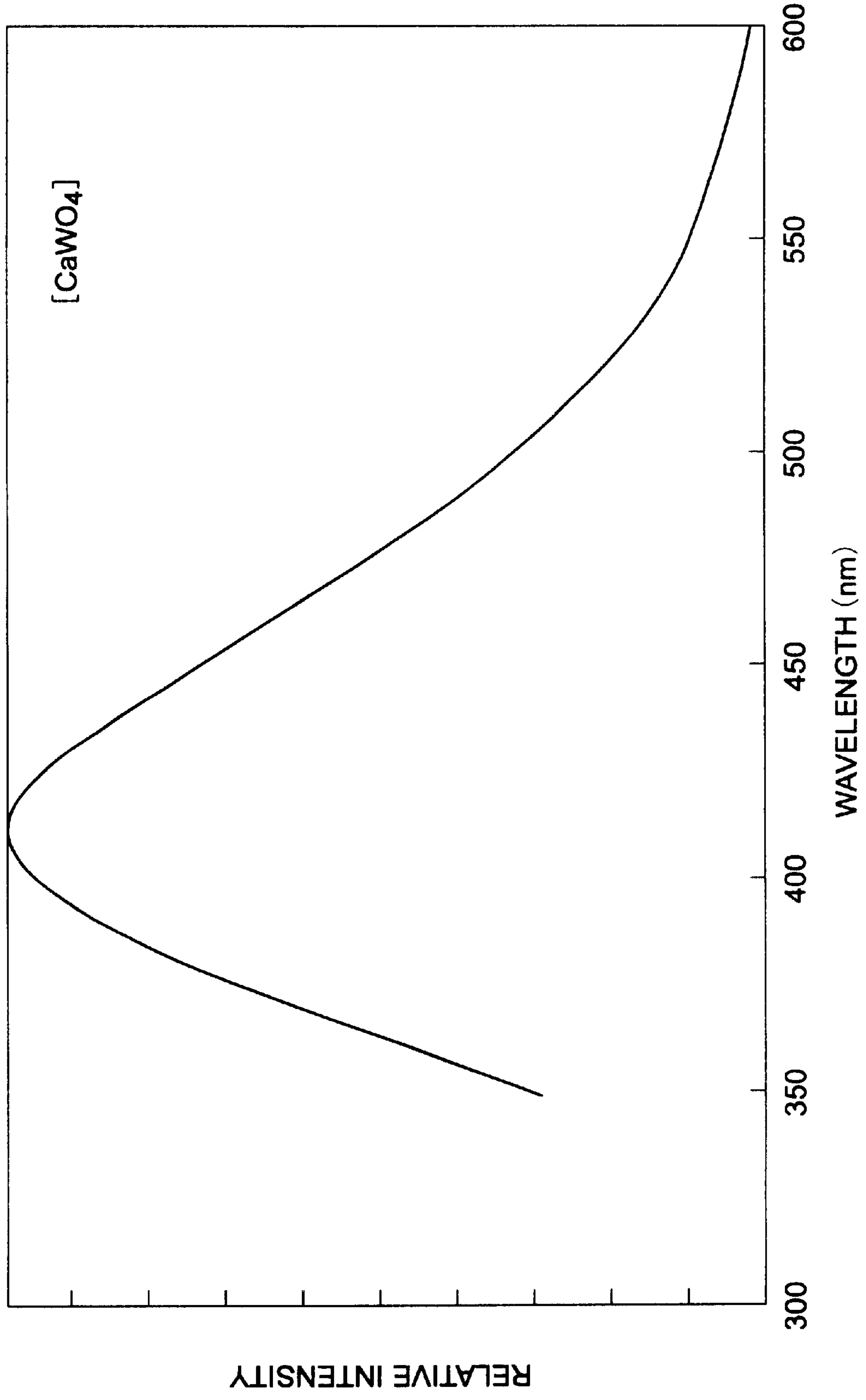
FIG. 6 is a diagram showing one example of an emission spectrum of a $CaWO_4$ phosphor used in the present color light emission sheet.

FIG. 6 is an emission spectrum of $CaWO_4$ phosphor, having a broad emission spectrum extending from a blue wavelength region to a green wavelength region. In this case, a blue light emission where a peak of the emission spectrum exists is a primary emission component, the green light emission being a secondary emission component. In the present invention, a phosphor broader in the emission wavelength range is adequate. Accordingly, (Ca, Mg) $WO_4$ phosphor where Mg substituted for part of Ca is preferably used. The substitution of Ca by Mg is preferable to be 10 mol % or less from a point of view of sensitivity or the like.

In the color light emission sheet 4 used in the present invention, the phosphor is not restricted to one in which one phosphor particle emits in a plurality of colors. Alternatively, a mixed phosphor of at least two kinds of phosphors selected for instance from a blue phosphor emitting primarily in blue color, a green phosphor emitting primarily in green color, and a red phosphor emitting primarily in red color can be used. The mixing ratio in this case can be appropriately set for the emission ratios of the primary emission component and the secondary emission component to be in the aforementioned range. As mentioned above, depending on the case, a mixed phosphor of which emission ratios of the primary emission component and the secondary emission component are the same can be used.

Figure 7:
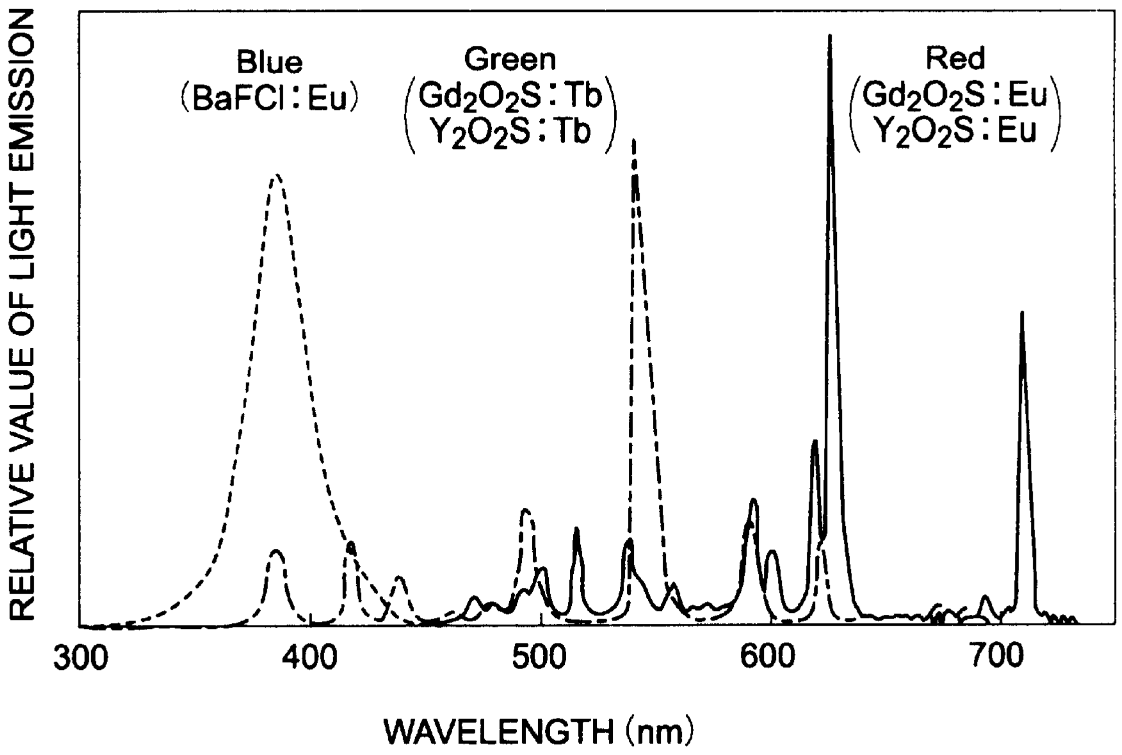
FIG. 7 is a diagram showing one example of an emission spectrum of a mixed phosphor used in the present color light emission sheet.

FIG. 7 is an emission spectrum of a mixed phosphor in which a red emitting phosphor ($Gd_2O_2S$:Eu or $Y_2O_2S$:Eu), a green emitting phosphor ($Gd_2O_2S$:Tb or $Y_2O_2S$:Tb) and a blue emitting phosphor ($CaWO_4$ or BaFCl:Eu) are mixed with an appropriate ratio. By appropriately setting the mixing ratio of these two kinds or more phosphors, the emission ratios of the primary and the secondary emission components can be adjusted.

The respective phosphors used in the mixed phosphor are not particularly restricted. As the blue emitting phosphors, $YAlO_3$:Ce, $Y_2SiO_5$:Ce, $Gd_2SiO_5$:Ce, $YTaO_4$:Nb, BaFCl:Eu, ZnS:Ag, $CaWO_4$, $CdWO_4$, $ZnWO_4$, $MgWO_4$, $Sr_5(PO_4)_3$ Cl:Eu, and $YPO_4$:Cl can be used.

As the red emitting phosphors, $GdBO_3$:Eu, $Gd_2O_3$:Eu, $Gd_2O_2S$:Eu, $Gd_3Al_5O_{12}$:Eu, $Gd_3Ga_5O_{12}$:Eu, $GdVO_4$:Eu, $Gd_3Ga_5O_{12}$:Ce, Cr, $Y_2O_3$:Eu, $La_2O_3$:Eu, $La_2O_2S$:Eu, $InBO_3$:Eu, and (Y, In)$BO_3$:Eu can be used.

As the green emitting phosphors, $Gd_2O_3$:Tb, $Gd_2O_2S$:Tb, $Gd_2O_2S$:Pr, $Gd_3Ga_5O_{12}$:Tb, $Gd_3Al_5O_{12}$:Tb, $Y_2O_3$:Tb, $Y_2O_2S$:Tb, $Y_2O_2S$:Tb, Dy, $La_2O_2S$:Tb, ZnS:Cu, ZnS:Cu, Au, $Zn_2SiO_4$:Mn, $InBO_3$:Tb, and $MgGa_2O_4$:Mn can be cited.

When a mixed phosphor is used, depending on a mixing state of the respective phosphors and a formation state of the phosphor layer 7, there may occur a deviation between a plurality of images based on the emission colors of the respective phosphors. That is, a complete matching between the respective images may not be obtained. Furthermore, when separating RGB signals from the obtained image (mixed data of images of a plurality of colors) to detect, due to the edge effect, there may occur problems in processing an image.

To this problem, when the phosphor in which one phosphor particle emits in a plurality of colors is used, fundamentally, a plurality of images based on the respective emission colors completely matches. Accordingly, the higher detection accuracy can be obtained. In the present invention, for instance a phosphor having the emission peaks in a plurality of emission wavelength regions and a phosphor having a broad emission peak extending over a plurality of emission wavelength regions can be preferably employed.

The color light emission sheet 4 as mentioned above can be manufactured for instance in the following ways.

That is, an appropriate amount of phosphor particles (including a mixed phosphor) is mixed with a binder, followed by addition of an organic solvent to prepare a phosphor coating liquid of an appropriate: viscosity. The phosphor coating liquid is coated on a sheet base 6 by means of a knife coater or a roll coater, followed by drying to obtain a phosphor layer 7.

As the binders used in preparation of the phosphor coating liquid, nitrocellulose, cellulose acetate, ethyl cellulose, polyvinyl butyral, flocculate polyester, polyvinyl acetate, vinylidene chloride-vinyl chloride copolymer, vinyl chloride-vinyl acetate copolymer, polyalkyl (metha) acrylate, polycarbonate, polyurethane, cellulose acetate butyrate, and polyvinyl alcohol can be cited. As the organic solvents, for instance, ethyl alcohol, methyl ethyl ether, butyl acetate, ethyl acetate, ethyl ether, and xylene can be used. In the phosphor coating liquid, as demands arise, dispersion agent such as phthalic acid and stearic acid and plasticizer such as triphenyl phosphate and diethyl phthalate may be added.

As the sheet basis 6, resin, for instance, such as cellulose acetate, cellulose propionate, cellulose. acetate butyrate, polyester such as polyethylene terephthalate, poly styrene, polymethyl methacrylate, polyamide, polyimide, vinyl chloride-vinyl acetate copolymer, and polycarbonate is formed in a film to use. When the reflective type color light emission sheet 4 is prepared a reflective resinous film in which carbon black or the like is kneaded can be used.

Furthermore, for the protective film 8 various kinds of transparent resins can be used. In specific, a transparent resinous film consisting of such as polyethylene terephthalate, polyethylene, poly vinylidene chloride or polyamide is laminated on the phosphor layer 7 to form the protective layer 8. Alternatively, transparent resins such as cellulose derivatives such as cellulose acetate, ethyl cellulose and cellulose acetate butyrate, polyvinyl chloride, polyvinyl acetate, vinyl chloride-vinyl acetate copolymer, polycarbonate, polyvinyl butyral, polymethyl methacrylate, polyvinyl formal, and polyurethane is dissolved in a solvent to prepare a protective film coating liquid of an appropriate viscosity. The protective film coating liquid thus obtained is coated on the phosphor layer 7, followed by drying to form a protective film 8.

Figure 8:
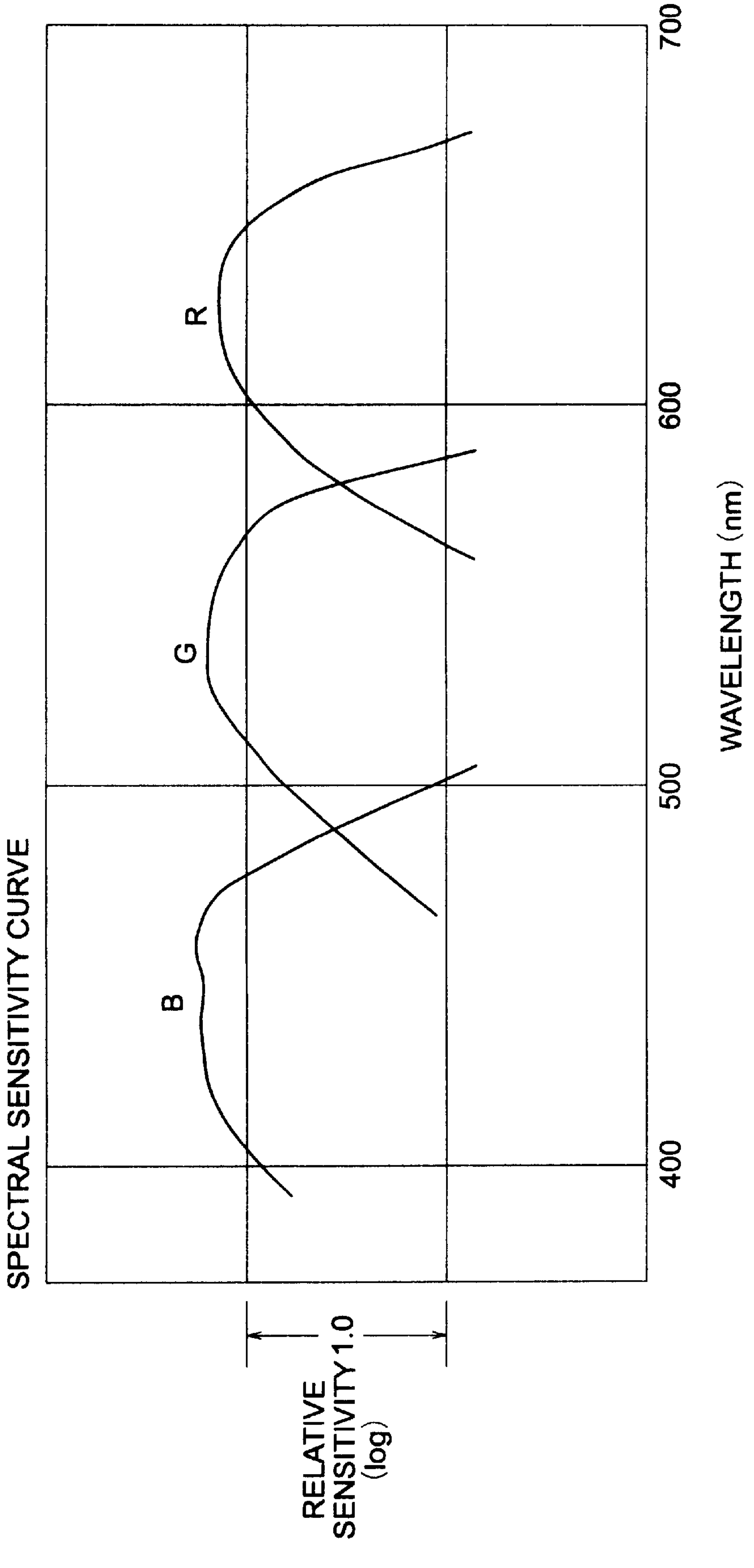
FIG. 8 is a diagram showing one example of spectral sensitivity curves of a color film used in the present invention.

The color film 5 is preferable to be a color film for photography use that receives light emitted in a plurality of colors from the aforementioned color light emission sheet 4 to take an image of a plurality of colors (for instance, blue image, green image and red image). FIG. 8 shows one example of a spectral sensitivity distribution curve of the color film 5.

On the color film 5, an image is formed as mixed data of images of a plurality of colors. From the image information, with the help of a film scanner or the like, RGB signals are separated to detect. That is, the image information is separated into the corresponding emission wavelengths of the phosphor to detect. Thus, the images of the respective colors in a mixed image of a plurality of colors, for instance, a red image, a green image and a blue image are separated to obtain the images of the respective colors as single images. The image information of the respective colors are recorded as for instance digital signals.

Here, consider the case where the phosphor constituting the phosphor layer 7 has an emission spectrum containing primary and secondary emission components, the secondary emission component being smaller in the brightness than the primary emission component. At this time, an image based on the primary emission component becomes an appropriate film density from a stage of relatively smaller exposure. That is, in the range where the exposure is relatively small, a characteristic curve between the film density and the exposure is formed. On the other hand, the secondary emission component being smaller in the brightness than the primary one, an image based on the secondary emission component becomes an appropriate film density in the larger exposure range relative to the primary one. That is, a characteristic curve is formed in the range of larger exposure relative to the primary one.

Thus, by obtaining a plurality of characteristic curves different in the exposure range, the exposure range to an appropriate range of film density demanded in radiography can be largely expanded in comparison with that for the existing one characteristic curve. That is, according to the present invention, the dynamic range in the radiography can be largely broadened.

Figure 9A:
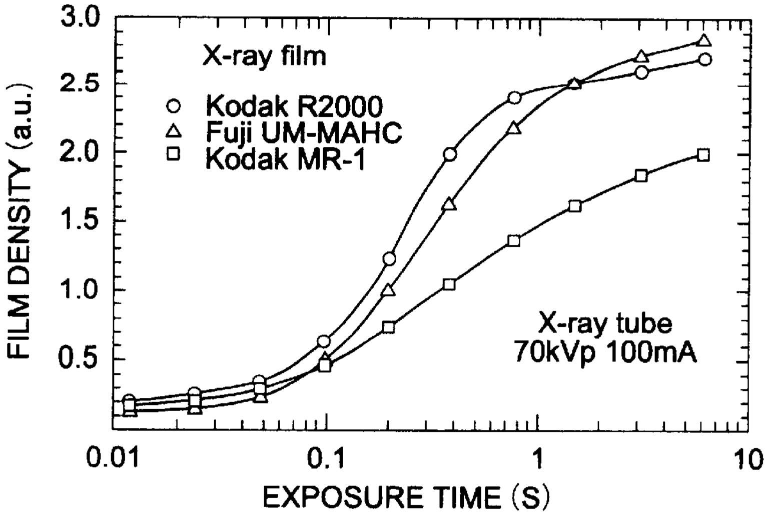
FIG. 9 is diagrams showing, in comparison with an existing monochrome X-ray film, measurements of sensitivity characteristic in the present X-ray radiography with a color film, FIG. 9A being a diagram showing measurements of the sensitivity characteristic with an existing monochrome X-ray film, FIG. 9B being a diagram showing measurements of the sensitivity characteristic with a first color film, FIG. 9C being a diagram showing measurements of the sensitivity characteristic with a second color film.
Figure 9B:
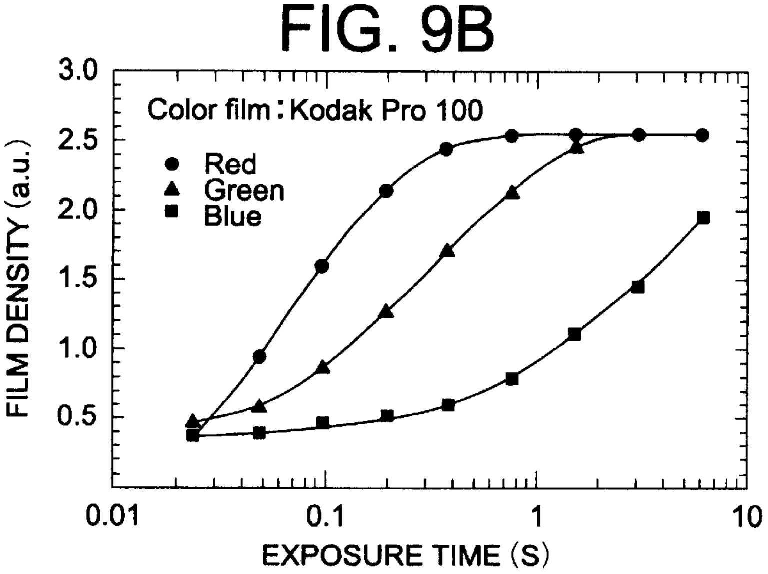
Figure 9C:
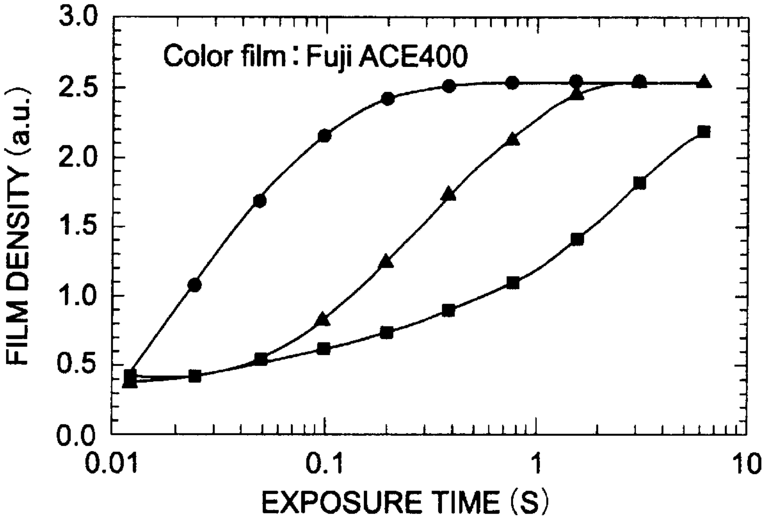

FIG. 9 shows a comparison between measurements of the sensitivity characteristics with the existing monochrome X-ray film and measurements of the sensitivity characteristics with the color film of the present invention. FIG. 9A is characteristic curves for the existing monochrome X-ray films, FIGS. 9B and 9C being characteristic curves with a combination of color films and $Gd_2O_2S$:Eu phosphor. In FIG. 9, an abscissa denotes exposure time, an ordinate denoting film density.

In the case of the existing monochrome X-ray film being used, though a little bit different depending on the kinds of film, the film density saturates in the range of approximately one to two digits.. On the other hand, a color film is generally constituted in three layers of red color, green color and blue color, each of these having different sensitivity characteristics. As evident from FIGS. 9B and 9C, the sensitivity characteristics of red, green and blue colors are different dependent on the kinds of film. However, it is found that owing to the use of the sensitivity characteristics of the three colors, in comparison with the existing monochrome X-ray film, the dynamic range can be broadened by approximately two digits.

This means that even if the red image saturates in the film density to unable to inspect, with the green or blue image, an appropriate inspection. can be carried out. Furthermore, for the part where the inspection can not be implemented due to the saturation of the film density of the green image, with the blue image., a suitable inspection can be implemented. A substance of higher atomic number or higher density can be observed with the red image, a substance of lower atomic number and lower density being observed with green and blue images.

In addition, commercial color films are different, depending on manufacturers and kinds, in sensitivity to red, green and blue components. Accordingly, by the use of a combination of the characteristics and that of the phosphor emitting in a plurality of colors, the dynamic range can be further modified. Furthermore, the color film, in comparison with the existing X-ray film (monochrome film), being more sensitive, can achieve high sensitivity of radiographs.

The plurality of characteristic curves based on the respective emission colors is preferable to be appropriately distanced from each other to expand the exposure range (dynamic range). Furthermore, in order to secure continuity (continuity in the exposure range) in radiography, the plurality of characteristic curves is preferable to be designed to partly overlap with each other. Accordingly, a ratio of the brightness of the secondary emission component to that of the primary one, that is a ratio of the light emission of the secondary emission component to that of the primary one under the same intensity of radiation is preferable to be in the range of 0.1 to 90%.

When the ratio of the secondary emission component to that of the primary one exceeds 90%, the characteristic curve due to the primary emission component and that due to the secondary one become too close on the scale of the relative exposure. As a result, it becomes difficult to obtain sufficient expanding effects of the dynamic range. From these viewpoints, the ratio of the light emission of the secondary emission component to that of the primary one is more preferable to be 80% or less, furthermore preferable to be 50% or less.

On the contrary, when the ratio of the light emission of the secondary emission component to that of the primary one is less than 0.1%, the characteristic curve due to the primary emission component and that due to the secondary one are too far distanced on the scale of the relative exposure. As a result, an intermediate exposure range therebetween is likely to be outside of the dynamic range of two characteristic curves. In this case, inspection precision can not be sufficiently improved. From these viewpoints, the brightness of the secondary emission component is further preferable to be 1% or more of that of the primary one.

Furthermore, there are cases where the color films differ in the sensitivity characteristics depending on the manufacturers and the kinds of the film. In such cases, the ratio of the light emission of the primary emission component of the phosphor to that of the secondary emission component thereof is adjusted, thereby light emissions corresponding to the respective sensitivity characteristics (characteristic curve) being obtained to result in good radiography. The ratio of light emissions, as mentioned above, can be adjusted in terms of the concentration of the activator. The ratio of light emissions can be also adjusted by inserting a color filter when reading RGB signals with a film scanner or the like to correct and read, or by correcting by use of a reading soft.

For instance, in a particular color film, by designating 100, 10 and 1 to the ratio among red, green and blue emissions, respectively, the dynamic range can be expanded by approximately two digits in comparison with that of the existing one. In another color film, by varying a ratio between the red emission and green emission, an excellent dynamic range can be obtained. Furthermore, when a color CCD camera is used as a light receiving element, the ratio of the light emissions of the primary and the secondary emission components of the phosphor is adjusted for the RGB signals to partially overlap in accordance with the dynamic range of the color CCD camera.

Thus, in the present invention, the ratio between the light emissions of the primary and secondary emission components of the phosphor is adjusted in accordance with the dynamic range of the radiography system. Thereby, the excellent radiography in which the dynamic range is expanded can be realized. Furthermore, by adjusting the ratio of the light emissions by means of the activator concentration of the phosphor, the obtained image information is freed from geometrical deviation.

Figure 10:
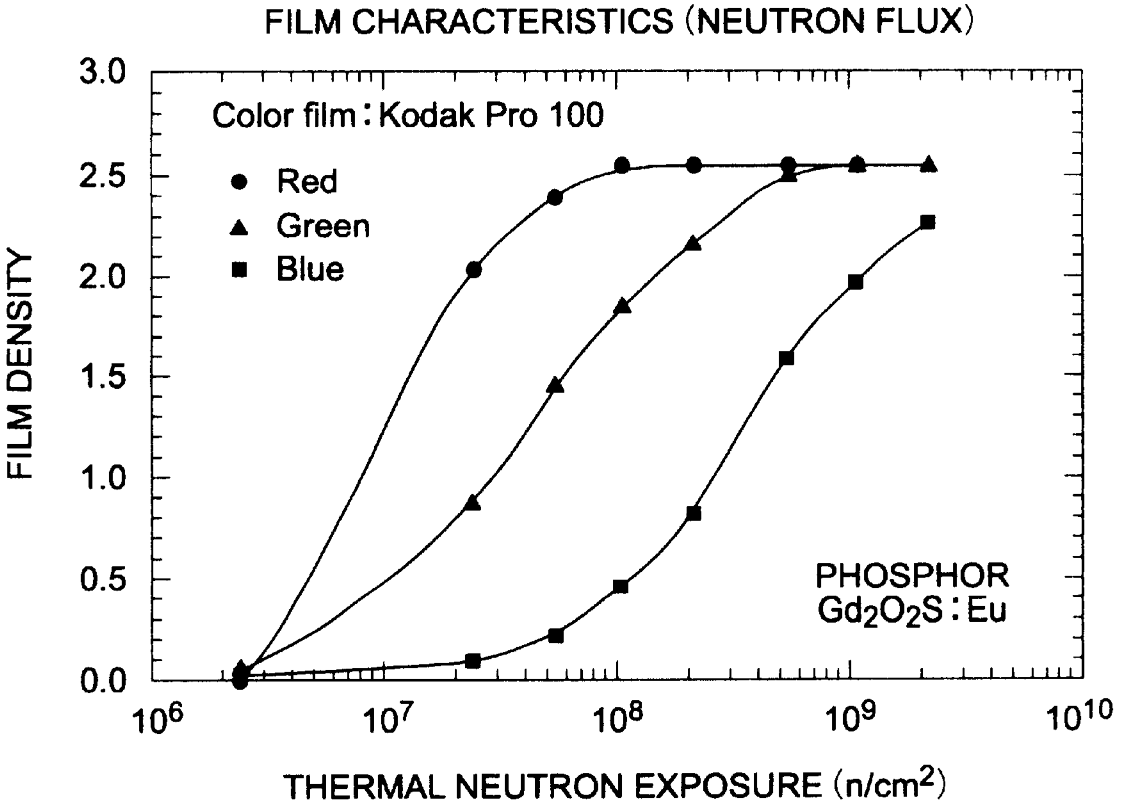
FIG. 10 is a diagram showing measurements of the sensitivity characteristic with a color film when thermal neutron is used as the radiation.

The color radiography system of the present invention can be applicable to, without restricting to X-rays, for instance to neutron radiography or the like. For instance, when a phosphor such as $Gd_2O_2S$:Eu phosphor containing Gd, B or Li having sensitivity to neutrons is used, by similarly differentiating the sensitivity characteristics of red, green and blue colors, the dynamic range can be expanded. FIG. 10 is a diagram showing measurements of the sensitivity characteristics of a color film to thermal neutron flux as the radiation. Thus, even when employing the thermal neutron flux, the dynamic range can be enlarged.

As mentioned above, according to the color radiography system of the present invention, if a condition of radiography (for instance, X-ray exposure) is a little bit deviated from an appropriate range, based on the expanded exposure range (dynamic range), an image of an appropriate density applicable to medical diagnosis and industrial non-destructive inspection can be obtained.

Figure 1:
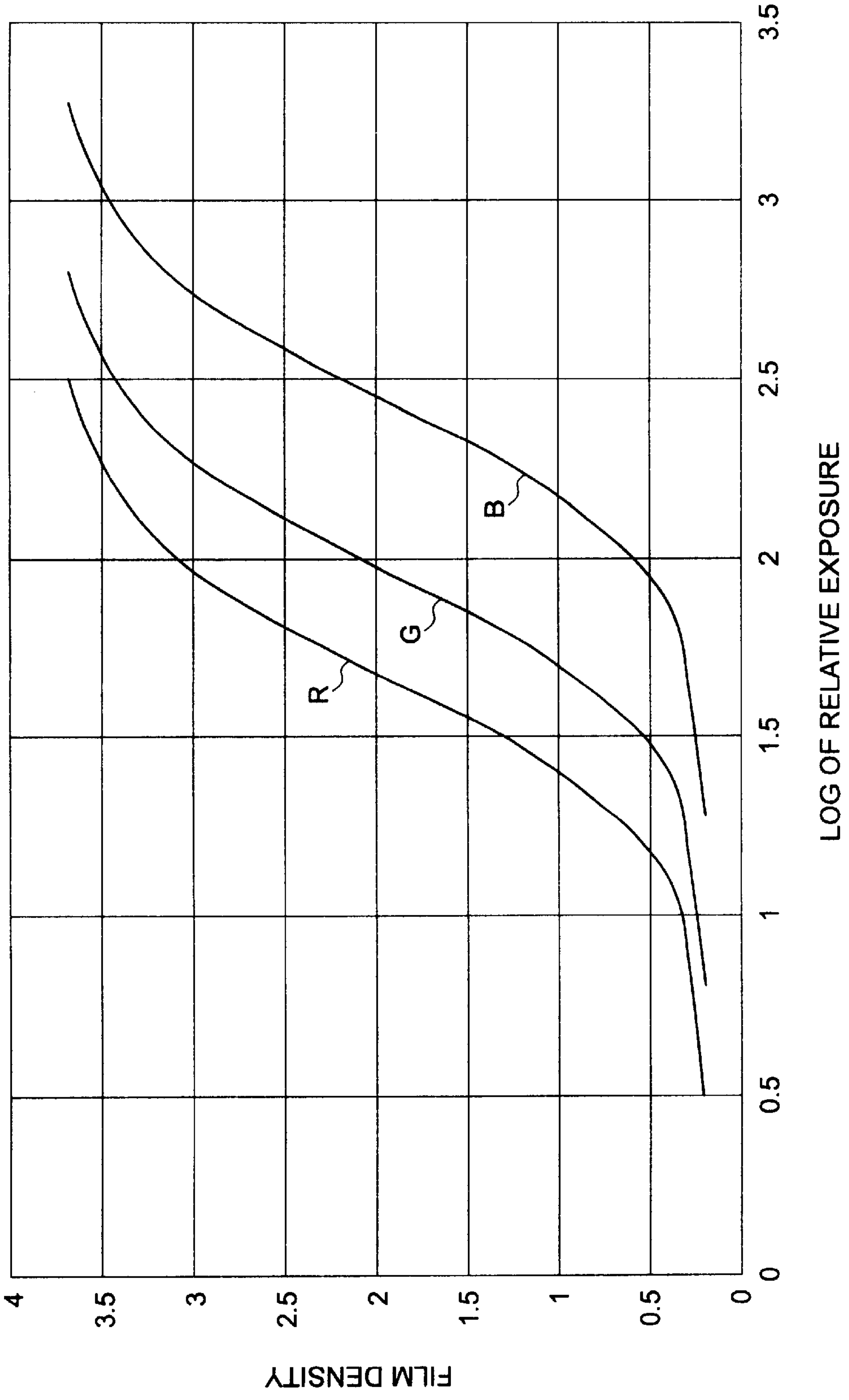
FIG. 1 is a diagram showing one example of characteristic curves between film density and exposure obtained when a color radiography system of the present invention is applied.

In specific, in the characteristic curve between the film density and the exposure shown in FIG. 1, consider that the exposure during radiographing deviates from the dynamic range of a first characteristic curve R based on the red emission for the red image to be excessively exposed. In this case, based on the dynamic ranges of second and third characteristic curves G and B based on the green and blue emission, green and blue images of appropriate density can be obtained. That is, erroneous radiography due to poor exposure or excessive exposure can be suppressed from occurring, thus resulting in obtaining an image of appropriate density under relatively broad radiographing condition.

Then, by separating the RGB signals from the image information based on the light emissions of a plurality of colors as mentioned above to detect, much information contained in the respective color signals can be effectively and assuredly obtained. By applying the present color radiography system like this to medical diagnosis, medical diagnosis ability can be largely improved. Furthermore, the enlargement of the dynamic range in the radiography leads to an increase of inspection information. Accordingly, a further improvement in inspection accuracy such as medical diagnostic ability can be attained.

When a higher contrast is required as in mammography in particular, in addition to the higher contrast, the dynamic range during the radiographing can be expanded. Thereby, the restriction on the radiographing conditions can be alleviated to largely contribute in an improvement of diagnostic ability. Even in the radiography for medical diagnosis other than mammography, the higher contrast of the radiographs leads to an enlargement of a diagnosis range and improvement of inspection accuracy. Accordingly, the medical diagnosis ability can be largely expanded.

When the present color radiography system is applied in radiography for industrial non-destructive inspection, due to the enlargement of the dynamic range, miss shots during radiographing can be suppressed from occurring. Furthermore, a complicated object such as for instance one in which substances different in specific gravity exist or one in which the same substance different in bulk density exists can be excellently radiographed and analyzed by only one shot. Thereby, an inspection error can be prevented from occurring, and an increase of the inspection information and an improvement of inspection accuracy can be attained.

Furthermore, in the existing radiography, since silver grains remain on the exposed X-ray film, the X-ray film is stored with the silver grains adhered. The radiography by means of the film is excellent in storage capacity of radiography data such as not allowing falsifying a record. However, in the existing system where the films with the silver grains are preserved, silver is not recycled to result in bad silver recycle. Accordingly, photosensitive resource is demanded to improve in recycling. By contrast, in the color film, silver halide in an emulsion layer can be recovered in the development process to realize recycling of resources (photosensitive resource) such as silver of rarity value. Furthermore, the finally obtained image information is converted into digital signals of RGB. Accordingly, storageability and transferability of the inspection information can be largely increased.

Next, an apparatus for color radiography to which the present method of color radiography is applied, that is a second embodiment of an apparatus for radiography will be described with reference to FIG. 11.

Figure 11:
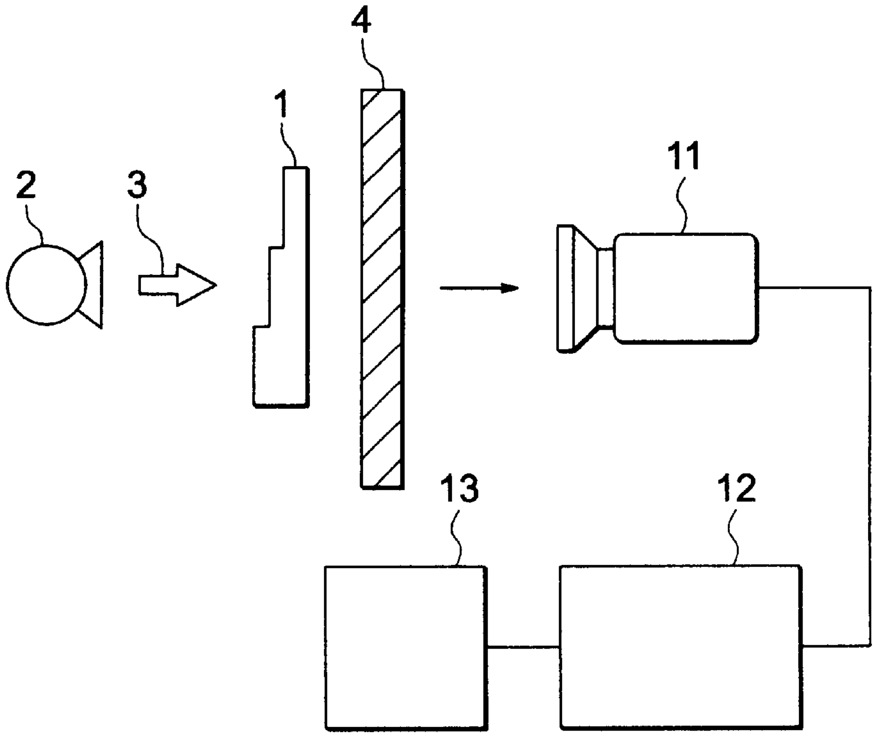
FIG. 11 is a diagram showing schematically a configuration of a second embodiment of an apparatus for radiography in which the present color radiography system is applied.

In the apparatus for radiography shown in FIG. 11, similarly with FIG. 2, the radiation such as the X-rays 3 transmitted through the subject 1 is irradiated onto the color light emission sheet 4. Behind the color light emission sheet 4, as a means for collectively receiving the light emitted in a plurality of colors from the color light emission sheet 4, a color CCD camera 11 is disposed. In the color CCD camera 11, the light emission of a plurality of colors (image information of a plurality of colors) having an emission distribution based on the distribution information of the X-rays 3 after absorption and scattering due to the subject 1 is collectively received.

The image information containing a plurality of color signals received by the color CCD camera 11 is separated into RGB signals by a processor 12 to detect as single image information of each color, respectively. The image information of the respective:colors is recorded as the digital signals. At this time, after separation of a white component, by changing a ratio of RGB signals, the dynamic range can be controlled. That is, similarly with the case where the color film is used, due to the image information of the respective colors, the dynamic range in the radiographing or the like can be expanded. In FIG. 11, reference numeral 13 is a display device, the image information of the respective colors being directly displayed.

Furthermore, the respective signals separated into the respective colors can be mutually processed therebetween to record the results. For instance, when one substance is confirmed to be different in a density by the red component and another substance is seen to be different in the density by the green component, the respective substances can be displayed with pseudo-colors to be discernible from each other. Furthermore, by cutting out only that portion, that portion can be separately displayed. Still furthermore, noise in the red component can be corrected with the green or blue component, or portion that is partly deficient of data and whitish being corrected. In particular, in the existing monochrome film, whether it is noise during film development or radiographing or it is a problematic portion or defect can not be critically judged. However, when from the data due to multiple colors the same tendency is confirmed in both red and green, accuracy in data judgement can be increased.

Figure 12:
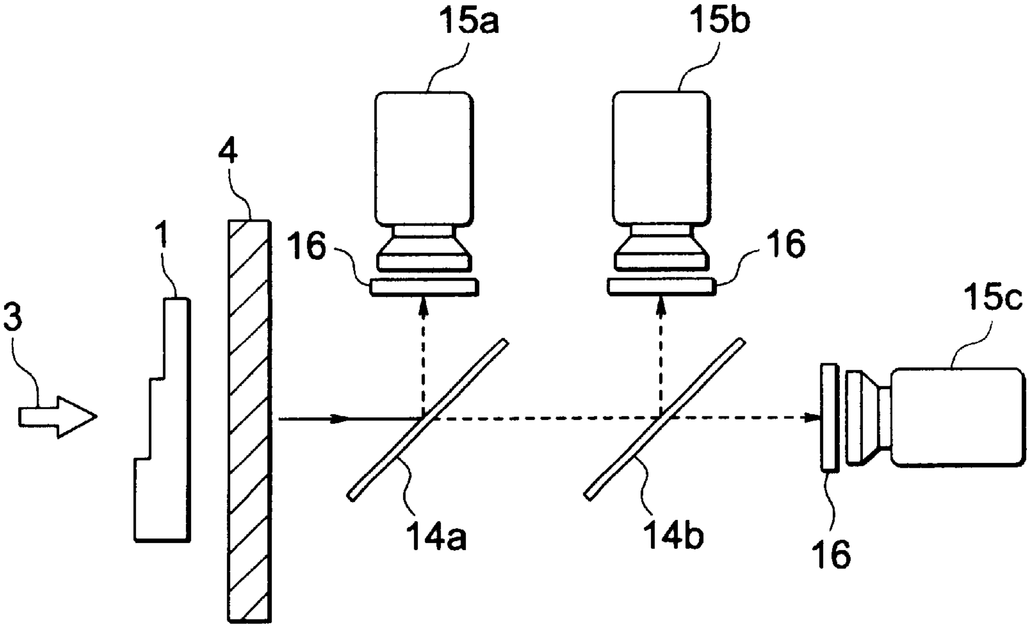
FIG. 12 is a diagram showing schematically a configuration of a third embodiment of an apparatus for radiography in which the present color radiography system is applied.

The light emitted in a plurality of colors from the color light emission sheet 4, as shown for instance in FIG. 12, after separating into the respective colors (wavelengths), can be detected separately. In FIG. 12, the light emitted in a plurality of colors, by means of first and second dichroic mirrors 14*a* and 14*b*, is separated into the respective wavelength ranges. The respective separated light signals are detected by the first, second and third monochrome CCD cameras 15*a*, 15*b* and 15*c*, respectively.

That is, the first dichroic mirror 15*a* reflects the red component only, allowing the green and blue components to transmit. The second dichroic mirror 14*b* reflects the green component only, allowing the blue component to transmit. At this time, due to the design of a dielectric multi-layer film configuring the dichroic mirror 14, reflectance and transmittance of the respective color components can be set separately. Accordingly, the sensitivities of the red, green and blue components can be controlled to be the optimum.

The red component is detected by means of the first monochrome CCD camera 15*a*. The green component is detected by means of the second monochrome CCD camera 15*b*, the blue component being detected by means of the third monochrome CCD camera 15*c*. The color signal detected by each monochromatic CCD camera 15 is recorded as single image information of the each color, respectively. The: respective colors of this time too, similarly with the case of the apparatus shown in FIG. 11, can be variously processed. The RGB signals separated and detected from the aforementioned color film in terms of the film scanner are similarly processed, too.

Furthermore, when only a particular wavelength is selected among the respective color components to measure, in front of the respective monochromatic CCD camera 15, a color filter 16 can be disposed to respond. When the dichroic mirror 14 is not wavelength selective, the wavelength selectivity can be adjusted through the transmittance of the color filter 16. Furthermore, when the mixed phosphor emitting in white color is used, with the color filter 16, the ratio of the light emissions, in other words, the sensitivity characteristics for each color can be adjusted.

In separating the light, without restricting to the dichroic mirror 14, optical filters such as a metal film interference filter, a glass filter and a band-pass filter, or an optical prism and a grating (diffraction grating) may be used. Furthermore, the light signal, without restricting to the CCD camera, can be detected with various kinds of light detection elements.

Next, another embodiment of the present invention will be explained.

In radiography with a human body as a subject, a contrast enhancement method such as angiography may be employed. In this case, a substance containing iodine or barium is injected into a human body as a contrast medium, and, in this state, radiography is implemented. At this time, the existing radiography shows simultaneously bones and internal organs on a monochrome X-ray film. To these points, by use of two kinds or more of phosphors each essentially consisting of an element different in K-absorption edge from the other, for instance only a substance having the K-absorption edge between the K-absorption edges of the two kinds of elements can be radiographed. In the color light emission sheet at this time, the phosphor layer 7 shown for instance in FIG. 3 is configured in a multi-layer structure, the respective phosphor layers each being constituted of a phosphor different in the K-absorption edge from the other.

For instance, the phosphor layer of the color light emission sheet is configured in a two-layer structure. For the first layer, a phosphor essentially consisting of an element that is smaller in the absorption edge than iodine or barium and larger than calcium in bones and hydrocarbon compounds in the internal organs is used. The K-absorption edge of indium is located at 27.940 keV, that of iodine 33.170 keV and that of barium 37.441 keV, respectively. For reference purposes, the K-absorption edge of calcium is 4.039 keV, that for hydrocarbon compounds being less than that. For the second layer, a phosphor essentially comprising an element larger in the K-absorption edge than iodine and barium is used. The K-absorption edge of gadolinium is 50.239 keV. The phosphors are selected for the emission colors to differ each other between the first and second layers, therefrom the respective color signals being detected by means of the color film or the CCD camera.

As a specific example of the phosphor layer of two layer structure, a configuration in which the first layer is formed of terbium activated indium borate ($InBO_3$:Tb) phosphor, the second layer being formed of europium activated gadolinium oxysulfide ($Gd_2O_2S$:Eu) phosphor can be cited. The terbium activated indium borate phosphor of the first layer has an emission spectrum having two peaks in green and blue colors. Europium activated gadolinium oxysulfide phosphor in the second layer is strong in red in the emission spectrum, followed by green and blue colors. In order to avoid for the green emissions from the first and second layers to mingle, an activator concentration (europium concentration) of the phosphor of the second layer is set higher to decrease largely the green and blue emission components. By implementing thus, the color signals can be separated with precision.

At a position where the K-absorption edge of indium of the first layer is low, the absorption characteristic of gadolinium of the second layer is multiplied by a factor to process. Since the K-absorption edge of the second layer is different from that of the first layer, the absorption becomes different between energies up to the K-absorption edge of the second layer and after that of the second layer. Accordingly, a substance having a K-absorption edge at an interval of approximately 28 to 50 keV sandwiched by the K-absorption edges of the first and second layers becomes stronger in contrast. Thus, only the contrast medium containing for instance iodine or barium can be radiographed.

As mentioned above, by differentiating the emission wavelengths of the two or more kinds of phosphors each different in the K-absorption edge, through processing between the respective color information, information only of a substance to be inspected can be easily obtained. Furthermore, by reducing the ratios of the secondary emissions other than the primary emissions of the phosphors constituting the respective phosphor layers, the lights emitted from the two kinds or more of phosphors each different in the K-absorption edge can be easily separated. Accordingly, the information of the substance to be inspected can be more assuredly obtained.

In the color radiography system taking advantages of the difference of K-absorption edge, various kinds of phosphors can be used. For the phosphors primarily emitting in red color, for instance, $GdBO_3$:Eu, $Gd_2O_3$:Eu, $Gd_2O_2S$:Eu, $Y_2O_3$:Eu, $Y_2O_2S$:Eu, $La_2O_3$:Eu, $La_2O_2S$:Eu, and $InBO_3$:Eu can be used.

For the phosphors primarily emitting in green color, $Gd_2O_3$:Tb, $Gd_2O_2S$:Tb, $Gd_2O_2S$:Pr, $Y_2O_3$:Tb, $Y_2O_2S$:Tb, $Y_2O_2S$:Tb, Dy, $La_2O_2S$:Tb, LaOBr:Tb, $InBO_3$:Tb and ZnS:Cu can be used. For the phosphors primarily emitting in blue color, BaFCl:Eu, BaFBr:Eu, $CaWO_4$, $YTaO_4$:Nb, LaOBr: Tm and ZnS:Ag can be used.

In the existing radiography system, a method is proposed in which within a color emulsion layer of a color film iodine, barium or cesium is mingled to convert the difference of absorption of these elements into the difference of the color information. However, in the method like this, there are disadvantages that the film itself has to be manufactured anew and the commercial film can not be used. Furthermore, since a particular element is necessary to be mixed within a film emulsion, each time when a different element is judged the film has to be changed.

By contrast, in the present color radiography system that takes advantages of the difference of the K-absorption edge, by selecting the K-absorption edge of the phosphor constituting the color light emission sheet, the same configuration can cope with any of iodine and barium for instance. As the elements similarly capable of coping with, Sn, Sb, Te, Xe, Cs, La, Ce, Pr, Nd, Pm, Sm and Eu can be cited.

In the present invention, by changing the K-absorption edge of the phosphor constituting the phosphor layer, furthermore elements can be coped with. Furthermore, by increasing the number of phosphor layer, a great deal of information can be obtained. For instance, by constituting the phosphor layer in three or four layer structure to separate not only into RGB signals but also into wavelengths inherent to elements, many elements can be simultaneously separated through image processing to analyze.

Next, specific embodiments of the present phosphor sheet for detecting radiation will be described.

Embodiment 1

First, $Gd_2O_2S$:Eu phosphor (Eu concentration of 0.3 mol %) of an average particle diameter of 2.0 $\mu$m is prepared. The $Gd_2O_2S$:Eu phosphor emits primarily in red, secondarily in green. Here, the brightness of green emission as the secondary emission component is approximately 20% of that of the primary emission component (red emission).

10 part by weight of the aforementioned $Gd_2O_2S$:Eu phosphor is mixed with 1 part by weight of vinyl chloridevinyl acetate copolymer as binder and an approximate amount of ethyl acetate as organic solvent to prepare a phosphor coating liquid. The phosphor coating liquid is uniformly coated by means of a knife coater on a sheet consisting of a transparent polyethylene terephthalate film of a thickness of 250 $\mu$m to be a phosphor coating weight after drying of 700 g/m$^2$ (70 mg/cm$^2$), followed by drying to form a phosphor layer. On the phosphor layer, a polyethylene terephthalate film of a thickness of 9 $\mu$m is laminated as a protective film. Thus, an aimed color light emission sheet is prepared.

Thus obtained color light emission sheet is combined with a color film Kodak Pro100 or Fuji ACE400 to constitute a color radiography system shown in FIG. 2. With the radiography system, radiography is implemented. From an image (a mixed image of red and green) formed on the color film, by means of the film scanner, RGB signals are separated to obtain the respective single images of red image and green image. As a result, it is confirmed that from the obtained red image (primary emission component) and the green image (secondary emission component), much information can be read out. By mere visual inspection of the mixed image formed on the color film, a sufficient amount of information can not been obtained.

Figure 13:
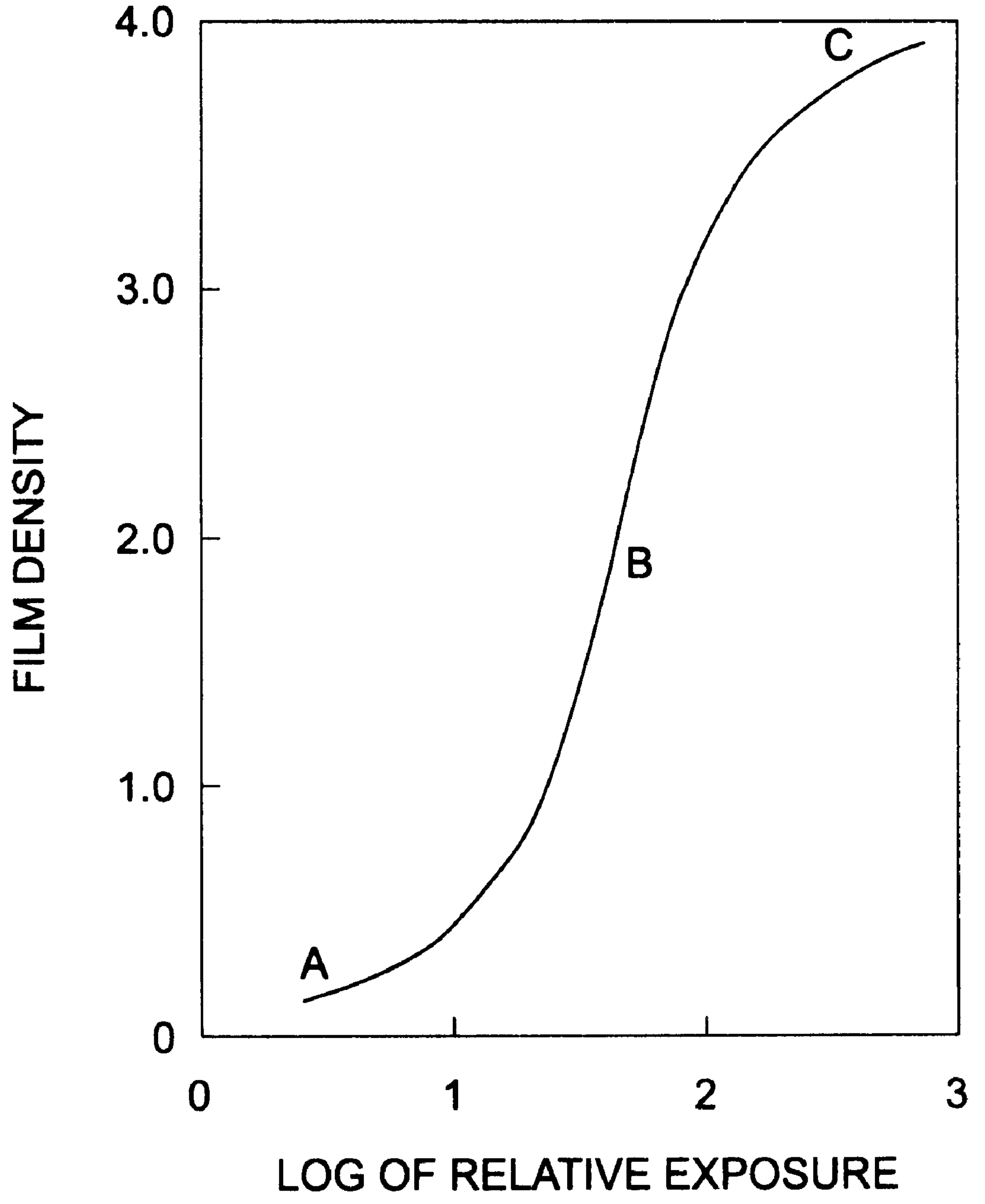
FIG. 13 is a diagram showing one example of a characteristic curve between film density and exposure in an existing radiography system.

Furthermore, when measuring the characteristic curves between the film density and the exposure based on the red and green images obtained by separating from the image formed on the color film, the following is found. That is, an exposure range corresponding to a film density in the range of 0.5 to 3.5 is expanded to approximately 5.25 times in comparison with the that of the existing one characteristic curve (FIG. 13).

Embodiment 2

First, $Gd_2O_2S$:Tb phosphor (Tb concentration of 0.3 mol %) of an average particle diameter of 2.0 $\mu$m is prepared. The $Gd_2O_2S$:Tb phosphor emits primarily in green, secondarily in blue. Here, the brightness of blue emission as the secondary emission component is approximately 50% of that of the primary emission component (green emission).

10 part by weight of the aforementioned $Gd_2O_2S$:Tb phosphor is mixed with 1 part by weight of vinyl chloridevinyl acetate copolymer as binder and an approximate amount of ethyl acetate as organic solvent to prepare a phosphor coating liquid. The phosphor coating liquid is uniformly coated by means of a knife coater on a sheet consisting of a transparent polyethylene terephthalate film of a thickness of 250 $\mu$m to be a phosphor coating weight after drying of 700 g/m$^2$ (70 mg/cm$^2$), followed by drying to form a phosphor layer. On the phosphor layer, a polyethylene terephthalate film of a thickness of 9 $\mu$m is laminated as a protective film. Thus, an aimed color light emission sheet is prepared.

Thus obtained color light emission sheet is combined with a color film Kodak Pro100 or Fuji ACE400 to constitute a color radiography system of the present invention. With the radiography system, radiography is implemented. From an image (a mixed image of green and blue) formed on the color film, by means of the film scanner, RGB signals are separated to obtain the respective single images of green image and blue image. As a result, it is confirmed that from the obtained green image (primary emission component) and the blue image (secondary emission component), a great deal of information can be read out. But, a sufficient amount of information can not been obtained by mere visual inspection of the mixed image formed on the color film.

Furthermore, when measuring the characteristic curves between the film density and the exposure based on the green and blue images obtained by separating from the image formed on the color film, the following is found. That is, a relative exposure range corresponding to a film density in the range of 0.5 to 3.5 is expanded to approximately 3.7 times in comparison with that of the existing one characteristic curve (FIG. 13).

Embodiment 3

A color light emission sheet is prepared similarly with Embodiment 2 with the exception of in place of the phosphor used in Embodiment 2, $Gd_2O_2S$:Tb phosphor (Tb concentration of 0.1 mol %) of an average particle diameter of 2.0 $\mu$m being used. In the $Gd_2O_2S$:Tb phosphor used in the present Embodiment 3, the brightness of the blue emission as the secondary emission component is approximately 60% of that of the primary emission component (green emission).

Thus obtained color light emission sheet is combined with a color film Kodak Pro100 or Fuji ACE400 to constitute a color radiography system of the present invention. With the radiography system, radiographs are taken. Similarly with Embodiment 2, it is confirmed that the green (primary emission component) and blue (secondary emission component) images can be excellently obtained, respectively. When measuring the characteristic curves between the film density and the exposure based on the green and blue images obtained by separating from the image formed on the color film, the following is found. That is, a relative exposure range corresponding to a film density.in the range of 0.5 to 3.5 is expanded to approximately 4.5 times in comparison with that of the existing one characteristic curve (FIG. 13).

Embodiment 4

First, $CaWO_4$ phosphor of an average particle diameter of 4.0 $\mu$m is prepared. The $CaWO_4$ phosphor emits primarily in blue, secondarily in green. The $CaWO_4$ phosphor used in Embodiment 4 has an emission spectrum with an emission peak at approximately 410 nm and a half-width of 100 nm, the brightness of the green emission as the secondary emission component being approximately 20% of that of the primary emission component (blue emission component).

10 part by weight of the aforementioned CaWO4 phosphor is mixed with 1 part by weight. of vinyl chloride-vinyl acetate copolymer as binder and an approximate amount of ethyl acetate as organic solvent to prepare a phosphor coating liquid. The phosphor coating liquid is uniformly coated by means of a knife coater on a sheet consisting of a transparent polyethylene terephthalate film of a thickness of 250 $\mu$m to be a phosphor coating weight of 700 g/$m^2$ (70 mg/$cm^2$) after drying, followed by drying to form a phosphor layer.

On the phosphor layer, a polyethylene terephthalate film of a thickness of 9 $\mu$m is laminated as a protective film. As a result, an aimed color light emission sheet is prepared.

Thus obtained color light emission sheet is combined with a color film Kodak Pro100 or Fuji ACE400 to constitute a color radiography system of the present invention. With the radiography system, radiographs.are taken. From an image (a mixed image of blue and green) formed on the color film, with the use of the film scanner, RGB signals are separated to obtain the respective single images of blue image and green image. As a result, it is confirmed that from the obtained blue image (primary emission component) and the green image (secondary emission component), a great deal of information can be read out. By mere visual inspection of the mixed image formed on the color film, a sufficient amount of information can not be obtained.

Furthermore, when measuring the characteristic curves between the film density and the exposure based on the red and green images obtained by separating from the image formed on the color film, the following is found. That is, a relative exposure range corresponding to a film density in the range of 0.5 to 3.5 is expanded to approximately 8 times in comparison with that of the existing one characteristic curve (FIG. 13).

Embodiment 5

A color light emission sheet is prepared similarly with Embodiment 4 with the exception of in the place of the phosphor used in Embodiment 4, (Ca, Mg) $WO_4$ phosphor in which part of Ca is replaced by 5 mol % of Mg being used. The (Ca, Mg) $WO_4$ phosphor used in the present Embodiment 5 has an emission peak at approximately 420 nm and a half-width of approximately 110 nm, the brightness of the green emission as the secondary emission component being approximately 30% of that of the primary emission component (blue emission).

Thus obtained color light emission sheet is combined with a color film Kodak Pro100 or Fuji ACE400 to constitute a color radiography system of the, present invention. With the radiography system, radiographs are taken. Similarly with Embodiment 4, it is confirmed that the blue (primary emission component) and green (secondary emission component) images can be excellently obtained, respectively. When measuring the characteristic curves between the film density and the exposure based on the blue and green images, the following is found. That is, a relative exposure range corresponding to a film density in the range of 0.5 to 3.5 is expanded up to approximately 7 times in comparison with that of the existing one characteristic curve (FIG. 13).

Embodiment 6

Similarly with Embodiment 1, a color light emission sheet is prepared with $Gd_2O_2S$:Eu phosphor. The $Gd_2O_2S$:Eu phosphor has a red emission component as the primary emission component, green and blue emission components as the secondary emission component. The brightness of the green emission as the secondary emission component is approximately 10 to 20% of that of the primary emission component (red emission), that of the blue emission being approximately 1 to 2% of that of the primary emission component (red emission).

X-rays are irradiated on the aforementioned color light emission sheet. The light emitted from the color light emission sheet under the irradiation of X-rays is let to go through a dichroic filter (Edmond Scientific Company, J52529N) that is a dielectric multi-layer filter formed on a face of a glass substrate, thereby only the red component being allowed to transmit. The transmitted red component is imaged by means of a high sensitivity CCD camera (Photometrics Ltd, Model 250) to display on a monitor. Thereby, an excellent image of the subject is obtained.

Next, when an amount of X-ray irradiation is raised by one digit to take a radiograph,: the red component resulted in a blank image. However, when the filter is changed to a dichroic filter (Edmond Scientific Company, AJ52535N) that transmits the green component alone, an excellent image is obtained.

When the amount of X-ray irradiation is further raised by one digit (by two digits in comparison with the case of the red component) to take a radiograph, the green component resulted in only a blank image.. However, when the filter is changed to a dichroic filter (Edmond Scientific Company, AJ52532N) that transmits the blue component alone, an excellent image is obtained.

From these results, it is found that in comparison with the system where the existing monochrome film is used, according to the present color radiography system, the range of relative exposure is expanded by approximately two digits. When the filter is changed to one that transmits only the blue component while observing the red emission component, only a black image is obtained. A specific system configuration is as shown in FIG. 12.

As mentioned above, according to the present method of and apparatus for color radiography, under various conditions, appropriate image information can be obtained and from the image information much information can be assuredly and effectively obtained. In particular, even when the contrast of a radiograph is increased, under relatively broad conditions, the image information of appropriate density can be obtained. Accordingly, in various kinds of radiography including medical radiography, suppression of miss shots an increase of inspection information and an improvement of inspection accuracy can be attained.

While the present invention has been particularly shown and described with reference to preferred embodiments thereof, it will be understood by those. skilled in the art that various changes in form and detail may be made therein without departing from the spirit, scope and teaching of the invention. Accordingly, the invention herein disclosed is to be considered merely as illustrative and limited in scope only as specified in the appended claims.

What is claimed is:

1. A method for color radiography, comprising the steps of:

irradiating radiation on a subject;

irradiating the radiation transmitted through the subject on a phosphor that emits in a plurality of colors by the radiation, ratios of light emissions of the plurality of colors under irradiation of the radiation of same intensity being different; and separating the light emitted in the plurality of colors from the phosphor under the irradiation of the radiation into the respective colors to detect.

2. The method for color radiography as set forth in claim 1:

wherein the phosphor comprises a primary emission component corresponding to one emission color within a visible light region and at least one secondary emission component, the secondary emission component comprising an emission color different from that of the primary emission component, the ratio of the light emission thereof being different from that of the primary emission component.

3. The method for color-radiography as set forth in claim 2:

wherein the secondary emission component has a ratio of light emission in the range of 0.1 to 90% with respect to that of the primary emission component.

4. The method for color radiography as set forth in claim 2:

wherein for the phosphor, an europium activated gadolinium oxysulfide phosphor is employed, through an amount of an europium activator of the gadolinium oxysulfide phosphor the ratios of light emissions of the primary and secondary emission components being adjusted.

5. The method for color radiography as set forth in claim 2:

wherein for the phosphor, an europium activated yttrium oxysulfide phosphor is employed, through an amount of an europium activator of the yttrium oxysulfide phosphor the ratios of light emissions of the primary and secondary emission components being adjusted.

6. The method for color radiography as set forth in claim 2:

wherein for the phosphor, a terbium activated gadolinium oxysulfide phosphor is employed, through an amount of a terbium activator of the gadolinium oxysulfide phosphor the ratios of light emissions of the primary and secondary emission components being adjusted.

7. The method for color radiography as set forth in claim 2:

wherein for the phosphor, a calcium tungstate phosphor is employed, through a partial replacement of calcium by magnesium the ratios of light emissions of the primary and secondary emission components being adjusted.

8. The method for color radiography as set forth in claim 2:

wherein for the phosphor, at least two kinds of phosphors selected from a blue emitting phosphor primarily emitting in blue, a green emitting phosphor primarily emitting in green, and a red emitting phosphor primarily emitting in red are mixed to use, through a mixing ratio of the phosphors the ratios of light emissions of the primary and secondary emission components being adjusted.

9. The method for color radiography as set forth in claim 1:

wherein the light emitted from the phosphor is let go through a color filter, thereby the ratios of light emissions of the plurality of colors being adjusted.

10. The method for color radiography as set forth in claim 1:

wherein in the step of separating the light to detect, the light that is emitted in the plurality of colors from the phosphor is collectively converted into an image on a color film, from the image the respective color signals corresponding to the light emissions of the plurality of colors being separated to detect.

11. The method for color radiography as set forth in claim 1:

wherein in the step of separating the light to detect, the light emissions of the plurality of colors from the phosphor is separated into the respective colors by a light detecting element to detect.

12. The method for color radiography as set forth in claim 1:

wherein for the phosphor, at least two kinds of phosphors each substantially containing an element different in a K-absorption edge from the other are employed, thereby the substance having a K-absorption edge between the K-absorption edges of the at least two kinds of elements contained in the at least two kinds of phosphors being detected.

13. The method for color radiography as set forth in claim 12:

wherein the at least two kinds of phosphors selected from a blue emitting phosphor primarily emitting in blue, a green emitting phosphor primarily emitting in green and a red emitting phosphor primarily emitting in red are employed.

14. The method for color radiography as set forth in claim 1:

wherein the method for color radiography is used for radiography for medical diagnosis or radiography for non-destructive inspection.

15. An apparatus for color radiography, comprising:

a radiation source for irradiating radiation on a subject;

color emitting means comprising a phosphor that upon irradiation of radiation transmitted through the subject, emits in a plurality of colors, ratios of light emissions of the plurality of colors to radiation of the same intensity being different; and means for separating the light emissions of a plurality of colors emitted from the phosphor under irradiation of the radiation to detect.

16. The apparatus for color radiography as set forth in claim 15:

wherein the means for separating the light to detect comprises a color film that collectively converts the light emitted in the plurality of colors from the phosphor into an image and means for separating RGB signals from the image formed on the color film to detect separately.

17. The apparatus for color radiography as set forth in claim 15:

wherein the means for separating the light to detect comprises a color camera collectively receiving the light emitted in the plurality of colors from the phosphor and means for separating output signal from the color camera into RGB signals to detect separately.

18. The apparatus for color radiography as set forth in claim 15:

wherein the means for separating the light to detect comprises means for separating the light emitted in the plurality of colors from the phosphor into the respective colors and a plurality of monochrome cameras detecting the respective light emissions separated into the respective colors.

19. A color light emission sheet, comprising:

a sheet base; and a phosphor layer of a single layer structure that is disposed on the sheet base and comprises a phosphor, the phosphor having a primary emission component primarily emitting under irradiation of radiation and at least one secondary emission component different in an emission color from that of the primary emission component, a ratio of light emission under irradiation of radiation of the same intensity being different from that of the primary emission component, wherein ratios of the light emissions of the primary and the secondary emission component are adjusted according to a dynamic range of a radiography system.

20. The color light emission sheet as set forth in claim 19:

wherein the phosphor is an europium activated gadolinium oxysulfide phosphor of which ratios of the light emissions of the primary and secondary emission components are adjusted through an amount of an europium activator.

21. The color light emission sheet as set forth in claim 20:

wherein the gadolinium oxysulfide phosphor contains the europium in the range of 0.1 to 10 mol %.

22. The color light emission sheet as set forth in claim 19:

wherein the phosphor is an europium activated yttrium oxysulfide phosphor of which ratios of the light emissions of the primary and secondary emission components are adjusted through an amount of an europium activator.

23. The color light emission sheet as set forth in claim 22:

wherein the yttrium oxysulfide phosphor contains the europium in the range of 0.1 to 10 mol %.

24. The color light emission sheet as set forth in claim 19:

wherein the phosphor is a terbium activated gadolinium oxysulfide phosphor of which ratios of light emissions of the primary and secondary emission components are adjusted through an amount of a terbium activator.

25. The color light emission sheet as set forth in claim 24:

wherein the gadolinium oxysulfide phosphor contains the terbium in the range of 0.01 to 1 mol %.

26. The color light emission sheet as set forth in claim 19:

wherein the phosphor is calcium tungstate phosphor, calcium in the calcium tungstate phosphor is partially replaced by magnesium to adjust the ratios of light emissions of the primary and secondary emission components.

* * * * *